L. J. LINDSAY.
MARKER FOR CORN PLANTERS.
APPLICATION FILED DEC. 8, 1913.
1,103,593.
Patented July 14, 1914.
2 SHEETS—SHEET 1.
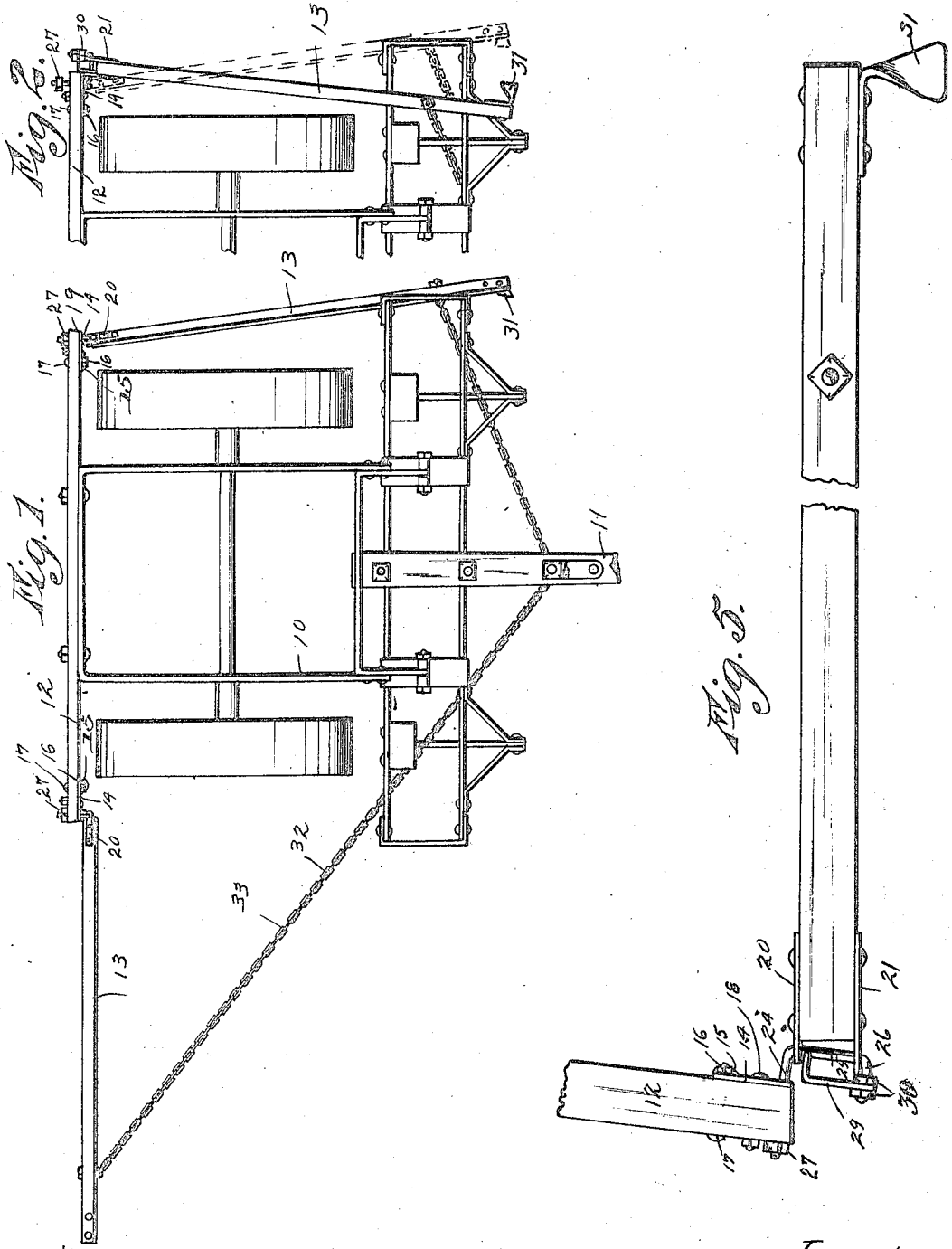
Witnesses.
Inventor
Leroy J. Lindsay
by Osweg & Bair
ATTORNEYS L. J. LINDSAY.
MARKER FOR CORN PLANTERS.
APPLICATION FILED DEC. 8, 1913.
1,103,593.
Patented July 14, 1914.
2 SHEETS—SHEET 2.
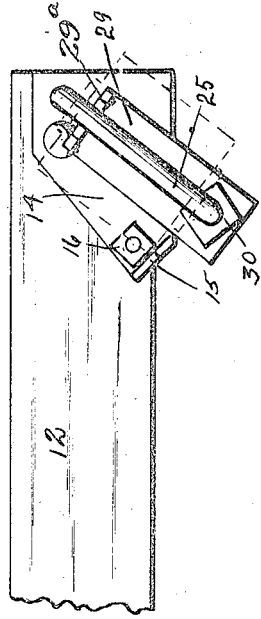
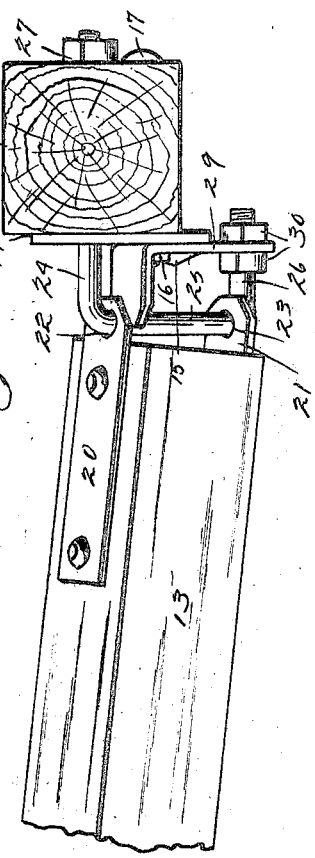
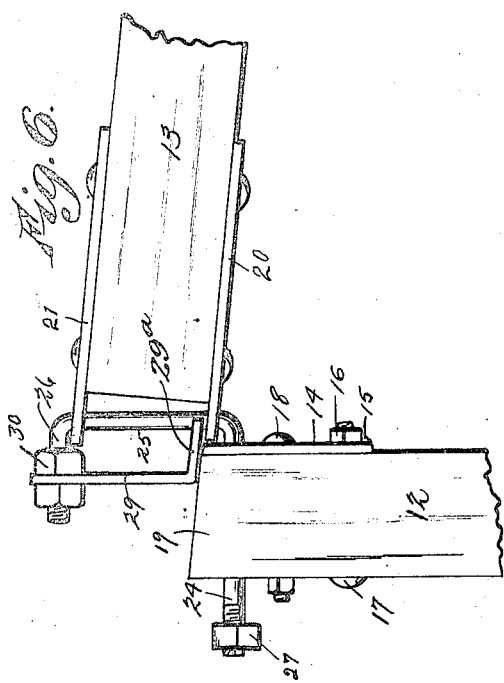
Witnesses.
Inventor
Leroy J. Lindsay
By Orwig & Bair
ATTORNEYS

UNITED STATES PATENT OFFICE.

LEROY J. LINDSAY, OF SEYMOUR, IOWA.

MARKER FOR CORN-PLANTERS.

1,103,593. Specification of Letters Patent. Patented July 14, 1914.

Application filed December 8, 1913. Serial No. 805,458.

*To all whom it may concern:*

Be it known that I, LEROY J. LINDSAY, a citizen of the United States, and resident of Seymour, in the county of Wayne and State of Iowa, have invented a certain new and useful Marker for Corn-Planters, of which the following is a specification.

My invention relates to and consists in certain new and useful improvements in markers for corn-planters. In some of the corn planters now in use, the check wire is arranged relatively high on the marker frame and in others it runs relatively low.

My object is to provide a marker of this class which may be readily, quickly and easily adjusted to be adapted to be placed on any of the corn planters now in general use so that whether the check wire is relatively high or relatively low, my improved marker arm may be adjusted so that it will not in any way be interfered with by the check wire.

More specifically it is my object to provide a marker device for corn planters, which marker device belongs to the class of markers in which two marker arms are employed in opposite sides of the planter and are arranged to automatically move to position for operating and also to position at rest.

The specific object, therefore, of my invention is to provide improved means for connecting the marker arms with the planter frame, whereby the arms may be readily, quickly and easily adjusted so that when they extend forwardly at their positions of rest they will be either high enough to clear check wires that are relatively low or low enough to clear check wires that are relatively high and the important feature of my improvement is the provision of a device of this kind that may be readily and quickly adjusted by an unskilled operator without the use of tools to meet the requirements of any particular planter and any conditions of work that may be encountered.

My invention consists in certain details, in the construction, combination and arrangement of the various parts of the device, whereby the objects contemplated are attained, as hereinafter more fully set forth, pointed out in my claims, and illustrated in the accompanying drawings, in which:

Figure 1 shows a top or plan view of a corn planter equipped with markers embodying my invention. Fig. 2 shows a detail view, showing the marker in its raised position, resting upon part of the planter frame. Fig. 3 shows a detail view showing the position of part of the mechanism for connecting the marker with the planter frame after the marker has been automatically raised. Fig. 4 shows a detail view of the same, taken at right angles to the view shown in Fig. 3. Fig. 5 shows a detail view, illustrating the position of the marker, as it is being rotated outwardly for locking it in its raised position, and Fig. 6 shows a detail view of a portion of one of the markers and the planter frame when the rotary locking movement has been completed.

In the accompanying drawings, I have used the reference numeral 10 to indicate generally a corn planter having a tongue 11 and a transverse member 12 back of the planter. The transverse member 12 is long enough to extend to a point outside the wheels, as shown in Fig. 1.

The markers 13 are secured to the frame member 12 in the following manner: Secured to the forward surface of the frame member 12, at each end thereof, is a plate 14. Formed on the lower inner edge of each of the plates 14 is a forwardly extending lug 15, which serves as a stop in the manner hereinafter mentioned and also as a lock for the nut 16 on the bolt 17. The bolts 17 and 18 extend through the plates 14 and the frame member 12 and serve to secure the plates 14 to said frame member. The outer ends of the frame member 12 are beveled from their forward edges rearwardly and outwardly at 19, as shown in Figs. 1 and 6. Assuming the marker to be in the position shown at the left hand side of Fig. 1, the inner end of each marker is provided with a plate 20 on its upper surface, which extends beyond the end of the marker and a plate 21 on its lower surface, which extends for a greater distance beyond the end of the marker as clearly shown in Fig. 6. The plates 20 and 21 are provided with openings or holes 22 and 23, the opening 23 being farther from the end of the marker 13 than the opening 22.

Rotatably mounted in and extending through each end of the frame 12 and through the plate 14 is a rod 24, which is somewhat longer than the thickness of the member 12, as shown in Figs. 4, 5 and 6. At its forward end the rod 24 is bent downwardly to form a portion 25, rotatably received in the openings 22 and 23. Formed on the lower end of the portion 25 is an extension 26 parallel with the main body of the rod 24. On the rear end of the rod 24 is a nut 27. Mounted on the end of the portion 26 is an upwardly extending bracket 29 held on the portion 26 by means of nuts 30. The upper end 29$^a$ of the bracket 29 is inclined toward and to the portion 25. The body of the bracket 29 is spaced from the portion 25 at such a distance that when the marker member 13 is swung to position extending forwardly in the machine at right angles, the bracket will engage the plate 14 and hold the marker 13 spaced from the frame member 12 at the greatest possible distance. The upper portion of the bracket 29, however, is spaced below the rod 24, so that when the marker 13 is swung forwardly to the position shown at the right hand side of Fig. 1 and its lower portion is rotated outwardly, the bracket 29 will clear the end of the frame member 12 as shown also in Fig. 6, and in Fig. 2, full lines.

The body of the bracket 29 is arranged parallel with the portion 25. When the marker is swung forwardly as shown at the right hand side of Fig. 1 and is then rotated outwardly and upwardly to the position shown in Fig. 6, the portion 29$^a$ will clear the end of the member 12 and the rod 24 will have some play in the frame member 12. The outer ends of the markers 13 are provided with marking blades 31, which extend downwardly when the markers are in the positions shown in Fig. 1. A flexible device 32 is connected with both of the markers 13 near their outer ends and is slidably mounted on the tongue 11. On the flexible device 32 are stop devices 33 designed to engage the tongue 11 and prevent the rearward movement of the markers 13 past position substantially in the same vertical plane as the frame member 12. The length of the flexible member 32 is such that when one of the members 13 is in position extending away from the machine at right angles thereto, as shown at the left hand side of Fig. 1, the other marker member 13 is drawn upwardly to the position shown at the right hand side of Fig. 1.

I will now describe the practical operation of my improved device. It will be noted that when one of the members 13 is in the position shown at the left hand side of Fig. 1, the other member is drawn to a position extending forwardly in the machine, as shown at the right hand side of said figure. Owing to the construction of the plates 20 and 21, and the openings therein, with the portion 25 of the rod 24 mounted in said openings, and to the construction of the bracket 29, it follows that when the member 13 is drawn to position extending forwardly in the machine, its forward end is raised insomuch as it is not pivoted to swing in a horizontal plane. The draft of the left hand member 13, as shown in Fig. 1, as the machine is drawn across the field, imposes a constant inward draft on the right hand member 13 and naturally tends to rotate the right hand member 13 on the rod 24. The rotary movement, however, of the last named member 13 is limited by means of the lug 15, which engages the edge of the bracket 29 so that the position of the portion 25 of the rod 24 which is connected with the right hand member 13 is substantially that shown in Fig. 3. When the machine reaches the end of the field and is turned toward the right, the machine swings around toward the member 13 on the right of the machine, which is the left hand member, as shown in Fig. 1, and the other member 13 drops down to the ground. It should be noted in this connection that the length of the frame member 12 is such with relation to the frame at the front part of the machine that when the markers are being automatically controlled, neither member 13 ever moves to position parallel with the longitudinal axis of the machine but extends from the member 12 forwardly and slightly outwardly. On this account and on account of the position shown in Fig. 3 assumed by the parts when one of the members 13 is in its raised position, it will readily be seen that when the machine is turned, as described above, the member 13 on the left hand side of the machine will readily drop away from the machine and to the ground while the member 13 on the right hand side of the machine will be raised until it engages the frame at the front of the machine.

When it is desired to place the markers in position to be out of the way, for hauling the machine from one place to another, without operating it, the marker members are drawn to the position shown by the dotted lines in Fig. 2, which is also the position shown in Fig. 4. The lower portions of the markers are then rotated outwardly to the position shown in Fig. 6, when the member 25 is in substantially horizontal position. The markers are then shoved rearwardly a short distance. The brackets 29 clear the ends of the frame member 12, the rod 24 slides rearwardly in said frame member and the members 13 may be rested upon the forward part of the frame of the machine. On account of the fact that the ends of the frame member 12 are beveled, the portions of the brackets 29 which extend toward the portion 25 of the rod 24 are arranged to be parallel with said beveled ends when the markers are in the position last mentioned, and it is therefore possible for the markers to extend forwardly and inwardly in the position shown in Fig. 6 and by the full lines in Fig. 2. The forward ends of the markers will rest upon the forward portion of the frame of the machine, as above mentioned; and the markers cannot swing laterally until they are drawn forward to permit the bracket 29 to clear the end of the member 12 so that the rod 24 may rotate to permit the portion 25 to drop downwardly to substantially vertical position. It should also be noted in this connection that the frame member 12 is so located as to be below the level of the forward part of the frame of the machine on which the markers may be conveniently rested.

Assume that my improved marker arm is to be applied to a planter in which the check wire runs under the forward end of the planter frame. In this condition it is desirable that the marker arm, at its forward limit of movement, be raised relatively high. To accomplish this purpose, I manipulate the lock nuts 30 so that the bracket 29 will be moved rearwardly a considerable distance from the rear end of the marker arm, and if necessary, the nut 27 on the rod 24 may be screwed up. Then when the marker arm is swung forwardly the bracket 29 will engage the member 14 snugly and there will be no longitudinal play of the rod 24 in the member 12. Because the lower end of the rod 25 is mounted, farther from the end of the member 13 than is the upper end thereof, the member 13 will swing upwardly as it is moved forward. If my device is to be applied to planters in which the check wire is relatively high, then it is desirable to have the marker, when at its forward limit, extend comparatively low. If the nuts 30 and 27 are moved to allow some play of the rod 24 during the forward movement of the arm 13, the arm 13 and parts thereof will sag and the bracket 29 will only engage the lower edge of the member 14 and the arm 13 will not be raised so high as when the members are erected as set forth in the last preceding paragraph. When desired for certain planters I manipulate the nuts 30 to bring the bracket 29 toward the rear end of the marker arm and I loosen the nut 27 on the rod 24 so that when the marker arm swings forwardly it will extend below the forward end of the planter frame and not in any way interfere with the check wire. It is to be understood that this adjustment of the bracket 29 need only be made once to adapt the device to a particular planter and after this the device operates automatically without any further readjustment of parts.

The parts are of comparatively simple and durable construction, are readily and easily installed or taken apart for repairs or replacement. Some changes may be made in the details of the construction of my device without departing from its essential features and it is my purpose to cover by this application any such changes which may be included within the scope of the appended claims.

I claim as my invention:

1. In a corn planter, a transverse frame member, a horizontal rod rotatably and slidably mounted in the frame member near its end, at right angles to the longitudinal axis thereof, a right angled extension on the forward end thereof, a marker arm pivotally mounted on said extension, a bracket mounted on said extension, arranged to engage the frame member in one position of said extension for holding the latter spaced from said frame member, and to clear the frame member in another position of the extension.

2. In a corn planter, a transverse frame member, a horizontal rod rotatably and slidably mounted in the frame member near its end, at right angles to the longitudinal axis thereof, a right angled extension on the forward end thereof, a marker arm pivotally mounted on said extension, at two points at different distances from the end of the marker arm, a bracket mounted on said extension, arranged to engage the frame member in one position of said extension for holding the latter spaced from said frame member, and to clear the frame member in another position of the extension.

3. In a corn planter, a transverse frame member having an end beveled from its rear side forwardly and inwardly, a horizontal rod rotatably and slidably mounted in the frame member near its end, at right angles to the longitudinal axis thereof, a right angled extension on the forward end thereof, a marker arm pivotally mounted on said extension, at two points at different distances from the end of the marker arm, a bracket mounted on said extension, arranged to engage the frame member in one position of said extension for holding the latter spaced from said frame member, and to clear the frame member in another position of the extension.

4. In a corn planter, a transverse frame member having an end beveled from its rear side forwardly and inwardly, a horizontal rod rotatably and slidably mounted in the frame member near its end, at right angles to the longitudinal axis thereof, a right angled extension on the forward end thereof, a marker arm pivotally mounted on said extension, at two points at different distances from the end of the marker arm, a bracket mounted on said extension, arranged to engage the frame member in one position of said extension for holding the latter spaced from said frame member and to clear the frame member in another position of the extension, and a stop on said frame member for engaging said bracket and limiting the rotary movement of the marker arm.

5. In a device of the class described, a transverse frame member having at each end a horizontal rod rotatably and slidably mounted in the frame member near its end, at right angles to the longitudinal axis thereof, a right angled extension on the forward end thereof, a marker arm pivotally mounted on said extension, at two points at different distances from the end of the marker arm, a bracket mounted on said extension, arranged to engage the frame member in one position of said extension for holding the latter spaced from said frame member, and to clear the frame member in another position of the extension, and a flexible member secured to each of the marker arms near the free end thereof and designed to be slidably mounted on the frame of the machine.

6. In a device of the class described, the combination of a rod designed to be rotatably and slidingly mounted in a planter frame member, a planter arm rotatably mounted on the forward end of said rod to swing in a plane substantially at right angles to the rod, and a bracket or spacing member adjustably connected to said rod to be capable of movement toward and from the rear end of the marker arm, said bracket or spacing member being designed to engage the part of the planter frame in which the said rod is mounted, to thereby hold the said rod at its forward limit of movement.

7. In a device of the class described, the combination of a rod designed to be rotatably and slidingly mounted in a planter frame member, a planter arm rotatably mounted on the forward end of said rod to swing in a plane substantially at right angles to the rod, and a bracket or spacing member adjustably connected to said rod, to be capable of movement toward and from the rear end of the marker arm, said bracket or spacing member being designed to engage the part of the planter frame to which the said rod is mounted, to thereby hold the said rod at its forward limit of movement, and adjustable means for limiting the forward movement of said rod relative to the planter frame member in which it is mounted.

Des Moines, Iowa, December 1, 1913.

LEROY J. LINDSAY.

Witnesses:
M. WALLACE,
L. ROBINSON.